(12) United States Patent
Sardo et al.

(10) Patent No.: US 10,835,859 B2
(45) Date of Patent: Nov. 17, 2020

(54) METHOD FOR PURIFYING A VOC-LADEN GAS STREAM

(71) Applicant: XEDA INTERNATIONAL S.A., Saint Andiol (FR)

(72) Inventors: Alberto Sardo, Chateaurenard (FR); Stefano Sardo, Chateaurenard (FR)

(73) Assignee: XEDA INTERNATIONAL S.A., Saint Andiol (FR)

( * ) Notice: Subject to any disclaimer, the term of this patent is extended or adjusted under 35 U.S.C. 154(b) by 364 days.

(21) Appl. No.: 15/759,008

(22) PCT Filed: Aug. 31, 2016

(86) PCT No.: PCT/EP2016/070501
§ 371 (c)(1),
(2) Date: Aug. 8, 2018

(87) PCT Pub. No.: WO2017/042072
PCT Pub. Date: Mar. 16, 2017

(65) Prior Publication Data
US 2018/0345208 A1 Dec. 6, 2018

(30) Foreign Application Priority Data
Sep. 9, 2015 (FR) .................................. 15 58372

(51) Int. Cl.
*B01D 53/14* (2006.01)

(52) U.S. Cl.
CPC ..... *B01D 53/1493* (2013.01); *B01D 53/1412* (2013.01); *B01D 53/1425* (2013.01);
(Continued)

(58) Field of Classification Search
CPC ................ B01D 53/14; B01D 53/1412; B01D 53/1425; B01D 53/1487; B01D 53/1493;
(Continued)

(56) References Cited

U.S. PATENT DOCUMENTS 1,395,940 A * 11/1921 Bassett .............. B01D 53/1406
568/699
5,427,759 A   6/1995 Heitmann
(Continued)

FOREIGN PATENT DOCUMENTS

CN    103 463 935    12/2013
EP    0 073 171    3/1983
(Continued)

OTHER PUBLICATIONS

International Search Report dated Oct. 21, 2016 in International Application No. PCT/EP2016/070501.

*Primary Examiner* — Renee Robinson
(74) *Attorney, Agent, or Firm* — B. Aaron Schulman, Esq.; Stites & Harbison, PLLC

(57) ABSTRACT

The purification method comprises:
a step for placing the laden gas stream in contact with a saline solution stream, the saline solution stream comprising, before placement in contact, at least 300 g/l of salts, at least part of the quantity of volatile organic compound being extracted from the laden gas stream and absorbed by the saline solution stream, the placement in contact step producing a purified gas stream containing a residual quantity of volatile organic compound and a laden saline solution stream;
a step for recovering the volatile organic compound, comprising a sub-step for decanting a laden saline solution stream, leading to the separation of a phase containing the volatile organic compound and of the saline solution.

13 Claims, 1 Drawing Sheet

(52) U.S. Cl.
CPC .... *B01D 53/1487* (2013.01); *B01D 2251/306* (2013.01); *B01D 2251/606* (2013.01); *B01D 2251/61* (2013.01); *B01D 2251/80* (2013.01); *B01D 2252/10* (2013.01); *B01D 2252/103* (2013.01); *B01D 2252/602* (2013.01); *B01D 2257/704* (2013.01); *B01D 2257/708* (2013.01); *B01D 2258/0275* (2013.01)

(58) Field of Classification Search
CPC .......... B01D 2252/10; B01D 2252/103; B01D 2257/708
See application file for complete search history.

(56) References Cited

U.S. PATENT DOCUMENTS

| | | | | |
|---|---|---|---|---|
| 6,136,203 | A | * | 10/2000 | Butters .................. C02F 1/725 210/743 |
| 2012/0219480 | A1 | * | 8/2012 | Simpson ............ B01D 53/1493 423/210 |
| 2013/0087742 | A1 | | 4/2013 | Blanchard |

FOREIGN PATENT DOCUMENTS

| | | |
|---|---|---|
| EP | 2 835 172 | 2/2015 |
| FR | 2 915 687 | 11/2008 |
| WO | WO-2014/206527 | 12/2014 |

\* cited by examiner

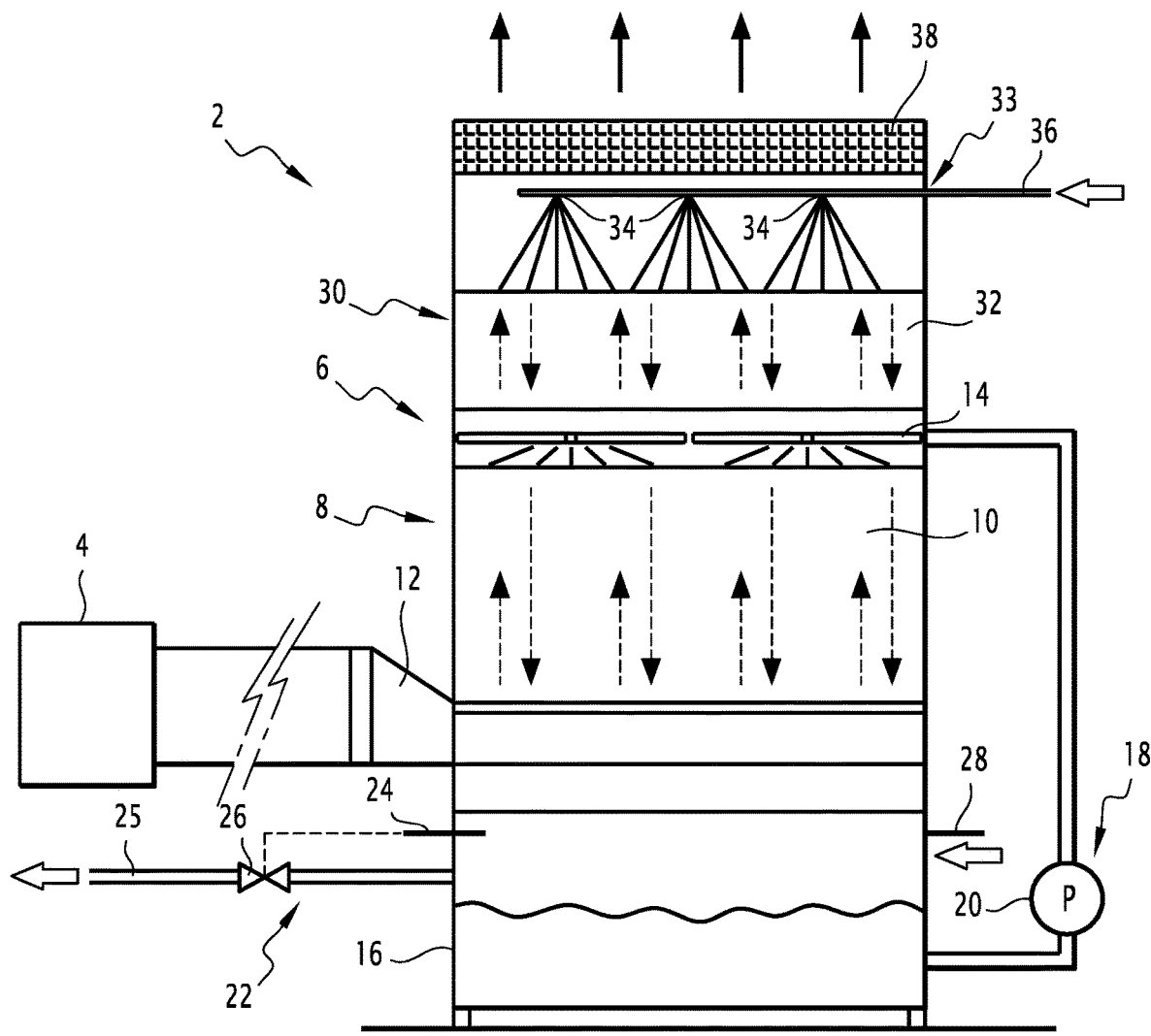

METHOD FOR PURIFYING A VOC-LADEN GAS STREAM

The present invention generally relates to methods for purifying a volatile organic compound- (VOC-) laden gas stream, such as water-soluble solvents, for example inferior alcohols and esters.

The reduction of VOC emissions in industry in general is a major issue.

Certain installations, for example fruit stations of the type described in the patent application filed under number PCT/FR2009/051783 discharging significant quantities of ethanol-laden gas.

Indeed, in these stations, a film-forming agent in solution in the ethanol is applied on the fruits. The installation comprises a coating area in which the film-forming agent is sprayed on the fruits, and a drying area. In the drying area, the fruits are exposed to a stream of air, so as to accelerate the evaporation of the solvent.

The stream of air leaving the drying area, based on the size of the installation, has a flow rate comprised between 10,000 $m^3/h$ and 100,000 $m^3/h$. The station discharges between 15 and 150 liters of ethanol per hour, i.e., between 12 and 120 kg of ethanol per hour.

Today, VOC discharges are regulated in France only for classified installations, but will soon be regulated for all types of installations.

The regulations for classified installations set out the following limits:
- discharge into the atmosphere of 110 mg/m3 of VOC in total carbon terms, or 210 mg/m3 for ethanol;
- discharge of water to a purification station with a chemical oxygen demand (COD) of 1 to 2 g/l, i.e., 0.9 g/l for ethanol in the best case.

The fruit station described above discharges about 1200 mg of ethanol per m3, i.e., six times more than the concentration set out by the law for classified installations.

Thus, there is a need for a method making it possible to purify a stream of VOC-laden gas, which respects both the discharge limits in the atmosphere and the discharge limits into purification stations.

To that end, the invention relates to a method for purifying a stream of laden gas comprising a quantity of volatile organic compound, the method comprising:
- a step for placing the laden gas stream in contact with a saline solution stream, the saline solution stream comprising, before placement in contact, at least 300 g/l of salts, at least part of the quantity of volatile organic compound being extracted from the laden gas stream and absorbed by the saline solution stream, the placement in contact step producing a purified gas stream containing a residual quantity of volatile organic compound and a laden saline solution stream;
- a step for recovering the volatile organic compound, comprising a sub-step for decanting a laden saline solution stream, leading to the separation of a phase containing the volatile organic compound and of the saline solution.

Thus, the method comprises a step for quenching the gas stream, which is well suited for the flow rates and VOC concentrations characterizing the drying air streams in the fruit stations. This step can be carried out at a reasonable cost.

The step for recovering the volatile organic compound makes it possible to limit the VOC discharges to purification stations and therefore to comply with the legal limit. The saline solution used in the step for placement in contact is highly concentrated in salt, which makes it possible to recover the volatile organic compound by simple decanting. This is particularly cost-effective.

The method assembly may further include one or more of the features below, considered individually or according to any technical possible combination(s):
- the volatile organic compound is a water-soluble solvent, for example an inferior alcohol or an ester, for example ethanol or ethyl acetate;
- the method comprises an additional step for placing the purified gas stream in contact with a water stream, at least part of the residual quantity of volatile organic compound being extracted from the purified gas stream and absorbed by the water stream, the additional step for placement in contact producing a final gas stream and a water stream laden with a volatile organic compound, mixed with the laden saline solution;
- the saline solution stream used in the placement in contact step is derived from the saline solution obtained in the decanting sub-step, the volume of saline solution being controlled while adjusting the water stream used in the additional placement in contact step;
- the saline solution is an aqueous solution comprising, before placement in contact, between 300 g/l and 1400 g/l of salts;
- the step for recovery of the volatile organic compound comprises a sub-step for concentration of the laden saline solution;
- the concentration sub-step is done by placing the laden saline solution stream in contact with a gas stream not laden with a volatile organic compound;
- the saline solution is an aqueous solution comprising, before placement in contact, between 300 g/l and 500 g/l of salts;
- the saline solution is an aqueous solution of phosphorus salts;
- the saline solution has, before placement in contact, the following composition:
  - alkali orthophosphate from 0 to 1500 g/l;
  - alkali pyrophosphate from 300 to 1500 g/l;
  - alkali hypophosphite from 0 to 800 g/l;
  - alkali phosphite from 0 to 800 g/l;
- the saline solution derived from the decanting sub-step is recycled in the placement in contact step; and
- the volatile organic compound has a solubility in water greater than 300 g/l, preferably greater than 500 g/l.

Other features and advantages of the invention will emerge from the detailed description thereof provided below, for information and non-limitingly, in reference to the sole appended FIGURE, showing an installation making it possible to carry out the purification method according to the invention.

The method according to the invention seeks to purify a gas stream comprising a quantity of volatile organic compound.

The gas stream is typically an air stream. It is laden with one or several volatile organic compounds. These volatile organic compounds are typically water-soluble solvents, for example inferior alcohols and esters. For example, the volatile organic compound is ethanol or ethyl acetate.

The method is particularly suitable for VOCs having a solubility in water greater than 300 g/l, preferably greater than 500 g/l.

The gas stream is derived from all types of industrial installations. For example, the gas stream is derived from a fruit or vegetable treatment station, in which a composition is dispersed on the fruits or vegetables. Alternatively, the gas stream is derived from different transformation industries (papers, fabrics, plastics, etc.), in which esters are used as glue solvents.

In the case of a fruit station, this composition for example contains an agent such as a film-forming agent intended to improve the conservation or appearance of fruits or vegetables, in a solvent. The solvent is a VOC or contains a VOC.

During the drying of the fruits or vegetables, the latter are exposed to an airstream seeking to accelerate the drying. The air stream comprises a significant quantity of volatile organic compound, coming from the evaporation of the composition spread on the fruits or vegetables.

The purification method comprises at least:
- a step for placing the VOC-laden gas stream in contact with a saline solution stream, at least part of the quantity of VOC being extracted from the laden gas stream and absorbed by the saline solution stream, the step for placement in contact producing a purified gas stream containing a residual quantity of VOC and a laden saline solution stream;
- a step for recovering the volatile organic compound, comprising a sub-step for decanting a laden saline solution stream, leading to the separation of a phase containing the volatile organic compound and of the saline solution.

The saline solution derived from the decanting sub-step is typically recycled in the placement in contact step.

After the placement in contact step, the gas stream may encounter pure water in order to reintegrate the evaporated water and complete the abatement of the solvent, as described below.

In the present application, "absorption" refers to the fact that the VOC is transferred from the gas to a liquid stream, here saline solution, irrespective of the physical or chemical mechanism causing this transfer.

The saline solution comprises a very large quantity of salt, and more specifically, before placement in contact with the gas stream, comprises at least 300 g/l of salt.

The placement in contact step is carried out using all appropriate means.

Advantageously, it is done by circulating the laden gas stream and the saline solution stream countercurrent with respect to each other.

In one example embodiment, the placement in contact step is done in an absorption tower, typically in a packed tower. The tower contains a large quantity of packings, for example elements made from honeycomb plastic, which makes it possible to increase the contact surface between the gas stream and the saline solution stream. The gas is introduced below the packings and circulates from bottom to top. The saline solution stream is sprayed above the packings and flows by gravity, from top to bottom.

Typically, the laden saline solution stream is collected in a decanting tub placed below the absorption tower.

The step for recovering the volatile organic compound, in particular the sub-step for decanting the laden saline solution stream, is done in this decanting tub.

The saline solution is typically an aqueous solution. Thus, the laden gas stream will become charged with moisture by evaporation of part of the water contained in the saline solution. The salt concentration of the saline solution therefore increases during the placement in contact step.

The VOC is brought down by dissolution in the saline solution.

If the VOC is ethanol, the water-ethanol equilibrium exists at the concentration of the azeotrope (about 95 wt % of ethanol and 5 wt % of water). Without being bound by this theory, the Applicant believes that if the laden gas stream is enriched with steam beyond the water saturation concentration, the excess water remains liquid and part of the ethanol is dissolved in this liquid, such that the concentration in the laden gas stream remains that of the azeotrope.

In the decanting sub-step, the laden saline solution stream splits into two phases: the phase containing the VOC, and the saline solution. The saline solution typically has a higher density than the phase containing the VOC, due to its salt content. It therefore accumulates in the lower part of the decanting tub. The phase containing the VOC floats above the saline solution.

The phase containing the VOC is withdrawn continuously or periodically.

The withdrawal means are of any appropriate type. In one example embodiment, the decanting tub is equipped with an automatic densimeter, positioned in the upper part of the tub. When the densimeter detects that the liquid filling the upper part of the tub is at a density corresponding to that of the phase containing the VOC, the densimeter causes the opening of an outlet for discharging the phase containing the VOC. For example, when the densimeter is unwatered due to the flow of the phase containing the VOC outside the tub, the densimeter commands the closing of the outlet.

Alternatively, the discharge of the phase containing the VOC is done by overflow, or by a siphon, etc.

The saline solution recovered in the lower part of the decanting tub is recycled. In other words, the saline solution stream used in the placement in contact step is derived from the saline solution obtained in the decanting sub-step.

For example, a pump or any other transfer member suctions the saline solution obtained at the end of the decanting sub-step, and discharges it toward the absorption tower.

Advantageously, the method comprises an additional step for placing the purified gas stream in contact with a water stream. The water stream is a pure water stream.

The purified gas stream is derived from the placement in contact step.

At least part of the residual quantity of volatile organic compound is extracted from the purified gas stream and absorbed by the water stream during this step. The additional placement in contact step produces a final gas stream and a water stream laden with volatile organic compound.

The final gas stream is discharged in the atmosphere, after passage in a potential eliminator plate. The final gas stream contains only a minimal quantity of VOC.

The VOC-laden water stream is typically mixed with the laden saline solution coming from the placement in contact step.

Typically, the additional placement in contact step is carried out in the same absorption tower as the placement in contact step.

To that end, the absorption tower comprises a main segment filled with packings, and an upper segment filled with additional packings, placed above the main segment.

The placement in contact step is done in the main segment, and the additional placement in contact step in the upper segment.

The injection of the saline solution stream is done between the packings and the additional packings.

The purified gas stream, which circulates from bottom to top in the main segment, directly penetrates the upper packings after leaving the main segment. It again circulates from bottom to top through the upper packings.

The water stream is injected above the upper packings, using any appropriate means.

For example, it is injected by nozzles supplied by a water supply circuit. The water stream circulates from top to bottom through the upper packings.

Typically, after the VOC-laden water stream has traversed the upper packings, it streams through the packings.

It is collected in the decanting tub, with the laden saline solution, and mixes therewith.

Preferably, the volume of saline solution is controlled by adjusting the water stream used in the additional placement in contact step.

Indeed, the final gas stream leaving the absorption tower is laden with moisture. Thus, it is necessary to add, periodically or continuously, an equivalent quantity of water, to keep the salt concentration of the saline solution at a predetermined value or within a predetermined range.

Ultimately, the method does not comprise the additional step for placing the purified gas stream in contact with a water stream, the purified gas stream then being discharged directly into the atmosphere, advantageously after passing through an eliminator plate.

In this case, the volume of saline solution is controlled by adding a quantity of water directly in the decanting tub. The latter is equipped with a water intake.

According to another alternative, for VOC extraction efficiency reasons, it is possible to set the water stream at a flow rate causing a quantity of water greater than that brought with the final gas stream to be introduced into the method. It is then necessary to discharge this additional quantity of water, to keep the salt concentration at its predetermined value or within its predetermined range.

To that end, the method is for example carried out during the day so as to treat the VOC-laden gas stream, while carrying out the additional placement in contact step. At night, the method is carried out with a non-VOC-laden stream, without carrying out the additional placement in contact step. The saline solution is therefore re-concentrated at night, due to the moisture brought with the final air stream.

According to a first embodiment, the saline solution has a salt concentration suitable for allowing both VOC absorption at night during the placement in contact step, and decanting of the laden saline solution stream, during the VOC recovery step.

In this case, the saline solution is typically an aqueous solution comprising, before placement in contact with the laden gas stream, between 300 g/l and 1400 g/l of salt.

This concentration in particular depends on the nature of the VOC.

In the case of ethanol, a concentration of 500 g/l of salt makes the saline solution immiscible with ethanol. Ethanol in a mixture concentrated with water forms a separate phase, during the decanting sub-step, floating on the saline solution. The ethanol phase has a weight content in ethanol between 30% and 95%, the rest essentially being water. The ethanol content depends on the salt concentration of the saline solution.

When the salt concentration exceeds 500 g/l, the decanting sub-step produces an ethanol solution containing a relatively high water concentration. However, the absorption of the ethanol during the placement in contact step is made easier.

Conversely, when the salt concentration is close to 1500 g/l, the decanting produces an ethanol solution containing very little water, for example 5 wt % of water. However, the transfer of the ethanol from the laden gas stream to the saline solution stream is less efficient.

In this first embodiment, the phase containing the VOC decants continuously, as the VOC is extracted from the laden gas stream.

In a second embodiment, the saline solution used in the placement in contact step comprises a lower salt concentration than in the first embodiment. This salt concentration is for example comprised between 300 g/l and 500 g/l. This concentration is not sufficient to cause the decanting of the laden saline solution stream, and therefore the separation of the phase containing the VOC and the saline solution.

In this case, the step for recovery of the volatile organic compound comprises a sub-step for concentration of the laden saline solution. This sub-step precedes the sub-step for decanting the laden saline solution stream.

The concentration sub-step is provided to increase the salt concentration of the laden saline solution, to a concentration allowing decanting of the laden saline solution stream.

For example, if the VOC is ethanol, it is possible to use a saline solution having a salt concentration of 400 g/l during the placement in contact step. During the concentration sub-step, the laden saline solution is concentrated until the salt concentration exceeds 500 g/l, and is for example equal to 1000 g/l.

In this case, the step for recovering the volatile organic compound is carried out after the placement in contact step, and not concomitantly therewith, like in the first embodiment.

For example, the placement in contact step is carried out during the day, and the VOC recovery step is carried out at night.

In one example embodiment, the concentration sub-step is done by placing the laden saline solution stream in contact with a gas stream not laden with a volatile organic compound.

This concentration sub-step is for example carried out in the absorption tower where the placement in contact step is carried out.

As indicated above, the placement of the non-VOC-laden gas stream in contact with the laden saline solution stream causes the gas stream to become laden with moisture, causing an increase in the salt concentration in the laden saline solution.

Typically, the saline solution is an aqueous phosphorus salt solution. As indicated above, the aqueous solution comprises at least 300 g/l of salt. For the first embodiment, it comprises between 300 and 1400 g/l of salt. For the second embodiment, the saline solution used in the placement in contact step comprises between 300 and 500 g/l of salt.

The saline solution comprises one or several phosphorus salts in mixture.

Typically, the saline solution has, before placement in contact, the following composition:
  alkali orthophosphate from 0 to 1500 g/l;
  alkali pyrophosphate from 300 to 1500 g/l;
  alkali hypophosphite from 0 to 800 g/l;
  alkali phosphite from 0 to 800 g/l.

These concentrations are for an aqueous solution, with the understanding that the solution comprises at least 300 g/l of salt.

The mixture of these salts has the advantage of reaching very high concentrations, which are stable at a low temperature compared to the salts used. It is possible to add other types of salts, for example potassium acetates or carbonates.

Preferably, the solution is prepared from tetrapotassium pyrophosphate, dipotassium orthophosphate, potassium hypophosphite and potassium phosphite.

Preferably, the saline solution has, before the placement in contact step, the following composition:
- tetrapotassium pyrophosphate: 400 to 800 g/l;
- dipotassium orthophosphate from 500 to 1000 g/l;
- potassium hypophosphite from 0 to 100 g/l;
- potassium phosphite from 0 to 200 g/l.

It should be noted that the method according to the invention normally does not comprise a step for heating the laden gas stream before the placement in contact step. It is typically done at the temperature at which the laden gas stream leaves the installation.

The method according to the invention is typically implemented in the assembly 2 shown in the FIGURE.

The laden gas stream to be treated comes from the installation 4.

The assembly 2 comprises an absorption tower 6, oriented vertically.

The absorption tower 6 comprises a main segment 8 in which packings 10 are positioned.

The packings 10 are typically plastic elements, in honeycomb form.

The tower 6 has an inlet 12 for the VOC-laden gas stream, connected to the installation 4. This inlet 12 is located below the packings 10.

The main segment 8 further comprises a device 14 for spraying the saline solution stream, placed above the packings 10. This device comprises nozzles or spray bars.

Furthermore, the assembly 2 comprises a decanting tub 16, placed below the tower 6, and more specifically below the main segment 8 of the tower. The main segment 8 of the tower is open toward the bottom, and the decanting tub 16 is open toward the top. Thus, the laden stream of saline solution streaming through the packings 10 is collected by gravitation directly in the decanting tub 16.

The assembly 2 further comprises a circuit 18 for recycling the saline solution from the decanting tub 16 to the spray device 14. The circuit 18 comprises a pump 20, or any other appropriate circulation member, having a suction mechanism connected to the decanting tub 16 and a discharge mechanism connected to the spray device 14. The suction mechanism of the pump 20 is connected to a low point of the decanting tub 16.

The assembly 2 further comprises a device 22 provided to discharge the phase containing the VOC. This device for example comprises an automatic densimeter 24, arranged to measure the density of the fluid filling an upper part of the decanting tub 16. The device 22 further comprises a discharge conduit 25, equipped with a controlled closing valve 26. The valve 26 is controlled by the automatic densimeter 24. The discharge conduit 25 emerges in the upper part of the decanting tub, at a level lower than that of the automatic densimeter 24.

Furthermore, the decanting tub 16 is typically equipped with a water intake 28, capable of being selectively opened or closed. The water intake 28 makes it possible to add water in the tub 16, to dilute the saline solution, if applicable.

Preferably, the tower 6 comprises an upper segment 30, in which the purified air stream coming from the main segment 8 is placed in contact with a water stream. The upper segment 30 is placed above the main segment 8. It comprises additional packings 32, positioned inside the tower 6, above the spray device 14 for the saline solution stream.

The additional packings 32 are for example honeycomb elements, made from plastic.

The upper segment 30 also comprises a device 33 for injecting the water stream, positioned above the additional packings 32. This device 33 comprises nozzles or spray bars 34, supplied by a water supply conduit 36.

The tower 6 further comprises an eliminator plate 38 positioned inside the tower 6, above the injection device for the water stream 33.

It should be noted that the assembly 2 is suitable for implementing both of the embodiments of the invention described above.

The operation of the assembly 2 is as follows.

The VOC-laden gas stream, coming from the installation 4, is introduced into the tower 6 by the inlet 12. It circulates from bottom to top through the packings 10.

The saline solution is sprayed by the spray device 14, above the packings 10. The saline solution circulates from top to bottom through the packings 10.

The VOC-laden gas stream and the saline solution circulate countercurrent in the packings 10, and are placed in contact with each other. Part of the quantity of VOC is extracted from the laden gas stream and absorbed by the saline solution stream.

The purified gas stream leaving the main segment 8 penetrates the upper segment 30. It circulates from bottom to top through the additional packings 32. A water stream is concomitantly injected into the upper segment 30, via the device 33. The water stream circulates from top to bottom through the additional packings 32. The residual quantity of VOC contained in the purified gas stream is transferred almost in its entirety to the water stream.

Upon leaving the upper segment 30, the final gas stream traverses the eliminator plate 38, and is discharged outside the tower 6. The eliminator plate 38 collects the drops of liquid in the final gas stream, and prevents these drops from being discharged outside the tower 6.

However, the final gas stream contains steam.

To keep the salt concentration of the saline solution constant, the water stream injected by the device 33 into the upper segment 30 of the tower 6 is typically adjusted so as to compensate for the quantity of steam driven by the final gas stream outside the tower.

The VOC-laden saline solution leaving the packings 10 is collected in the decanting tub 16. Likewise, the VOC-laden water stream leaving the additional packings 33 streams through the packings 10 and is also collected in the decanting tub 16.

Due to the high salt concentration in the saline solution, this saline solution and the VOC phase are not miscible. Thus, decanting occurs within the tub, leading to the separation of the VOC phase in the upper part and the saline solution in the lower part.

As the VOC is extracted from the laden gas stream, the quantity of VOC in the laden saline solution increases. The height of the VOC phase in the decanting tub 16 therefore also increases. When the densimeter 24 is submerged in the VOC phase, the densimeter 24 causes the valve 26 to open. This makes it possible to discharge part of the VOC phase.

A detailed example embodiment will now be described. It relates to the purification of an ethanol-laden air stream, coming from a fruit station 4. In this fruit station, a film-forming agent in solution in ethanol is sprayed on fruit. The fruit subsequently undergoes a drying operation, by the air stream circulating in contact with the fruit. This air stream becomes laden with ethanol. The purification method seeks to treat the ethanol-laden air stream, at the outlet of the fruit station.

The air flow rate is comprised between 10,000³/h and 100,000³/h. The ethanol flow rate is comprised between 15 and 150 liters of ethanol per hour, or between 12 and 120 kg of ethanol per hour.

The saline solution is an aqueous solution having the following composition:
tetrapotassium pyrophosphate from 400 to 800 g/l;
dipotassium orthophosphate from 500 to 1000 g/l;
potassium hypophosphite from 0 to 100 g/l;
potassium phosphite from 0 to 200 g/l.

The concentration of the various elements above is chosen as a function of the ethanol content in the air stream.

The section of the tower 6, considered perpendicular to the vertical direction, is from 0.1 to 1 m² for 1000 m³/h of air to be treated.

The flow rate of phosphate salt aqueous solution recirculated and injected by the device 14 is from 1000 to 20,000 l/h for 1000 m²/h of air to be treated.

The water flow rate injected into the upper segment of the tower 6 is adjusted to compensate for the quantity of water brought with the final gas stream outside the tower.

It should be emphasized that the additional placement in contact step has multiple advantages.

It makes it possible to capture a fraction of the VOCs. It facilitates the dissolution of the VOCs in the saline solution, by lowering the salt concentration in the saline solution when the latter is too high.

It keeps the salt concentration of the saline solution constant, by compensating for the quantity of steam brought by the air stream.

The saline solution injected in the placement in contact step is initially diluted by the water stream injected in the additional placement in contact step, then is gradually concentrated by evaporation during the placement in contact step. This next allows the separation of the VOC and the saline solution and the recovery step.

The invention claimed is:

1. A method for purifying a stream of laden gas comprising a quantity of volatile organic compound, the method comprising:
placing the laden gas stream in contact with a saline solution stream, the saline solution stream comprising, before placement in contact, at least 300 g/l of salts, at least part of the quantity of volatile organic compound being extracted from the laden gas stream and absorbed by the saline solution stream, said placing the laden gas stream in contact with the saline solution stream producing a purified gas stream containing a residual quantity of volatile organic compound and a laden saline solution stream; and
recovering the volatile organic compound, comprising decanting the laden saline solution stream, leading to the separation of a phase containing the volatile organic compound and of the saline solution;
wherein said recovering the volatile organic compound comprises concentrating the laden saline solution.

2. The method according to claim 1, wherein the volatile organic compound is a water-soluble solvent.

3. The method according to claim 2, wherein the water-soluble solvent is an alcohol or an ester.

4. The method according to claim 2, wherein the water-soluble solvent is ethanol or ethyl acetate.

5. The method according to claim 1, wherein the method further comprises placing the purified gas stream in contact with a water stream, at least part of the residual quantity of the volatile organic compound being extracted from the purified gas stream and absorbed by the water stream, said placing the purified gas stream in contact with the water stream producing a final gas stream and a water stream laden with the volatile organic compound, which is then mixed with the laden saline solution.

6. The method according to claim 5, wherein the saline solution stream used in said placing the laden gas in contact with the saline solution stream is derived from the saline solution obtained in said decanting the laden saline solution stream, the volume of saline solution being controlled while adjusting the water stream used in said placing the purified gas stream in contact with a water stream.

7. The method according to claim 1, wherein the saline solution is an aqueous solution comprising, before said placing the laden gas in contact with the saline solution stream, between 300 g/l and 1400 g/l of salts.

8. The method according to claim 1, wherein concentrating the laden saline solution is done by placing the laden saline solution stream in contact with a gas stream that is not laden with a volatile organic compound.

9. The method according to claim 1, wherein the saline solution is an aqueous solution comprising, before said placing the laden gas in contact with the saline solution stream, between 300 g/l and 500 g/l of salts.

10. The method according to claim 1, wherein the volatile organic compound has a solubility in water greater than 300 g/l.

11. A method for purifying a stream of laden gas comprising a quantity of volatile organic compound, the method comprising:
placing the laden gas stream in contact with a saline solution stream, the saline solution stream comprising, before placement in contact, at least 300 g/l of salts, at least part of the quantity of volatile organic compound being extracted from the laden gas stream and absorbed by the saline solution stream, said placing the laden gas in contact with the saline solution stream producing a purified gas stream containing a residual quantity of volatile organic compound and a laden saline solution stream;
recovering the volatile organic compound, comprising decanting the laden saline solution stream, leading to the separation of a phase containing the volatile organic compound and of the saline solution;
wherein the saline solution is an aqueous solution of phosphorous salt.

12. The method according to claim 11, wherein the saline solution comprises, before said placing the laden gas in contact with the saline solution stream, the following composition:
alkali orthophosphate from 0 to 1500 g/l;
alkali pyrophosphate from 300 to 1500 g/l;
alkali hypophosphite from 0 to 800 g/l; and
alkali phosphite from 0 to 800 g/l.

13. A method for purifying a stream of laden gas comprising a quantity of volatile organic compound, the method comprising:
placing the laden gas stream in contact with a saline solution stream, the saline solution stream comprising, before placement in contact, at least 300 g/l of salts, at least part of the quantity of volatile organic compound being extracted from the laden gas stream and absorbed by the saline solution stream, said placing the laden gas in contact with the saline solution stream producing a purified gas stream containing a residual quantity of volatile organic compound and a laden saline solution stream;

recovering the volatile organic compound, comprising decanting the laden saline solution stream, leading to the separation of a phase containing the volatile organic compound and of the saline solution;

wherein the saline solution derived from the decanting is recycled in said placing the laden gas in contact with the saline solution stream.

* * * * *